June 4, 1968 T. B. BISSETT ET AL 3,387,288

RAPID READOUT OF ELECTROLYTIC CELL ACCUMULATOR

Filed May 24, 1967 2 Sheets-Sheet 1

INVENTORS:
Thomas B. Bissett
Martin S. Tatch

ATTORNEYS

INVENTORS:
Thomas B. Bissett
Martin S. Tatch

ATTORNEYS

United States Patent Office 3,387,288
Patented June 4, 1968

3,387,288
RAPID READOUT OF ELECTROLYTIC
CELL ACCUMULATOR
Thomas B. Bissett, Malibu, and Martin S. Tatch, West
Los Angeles, Calif., assignors to The Bissett-Berman
Corporation, Santa Monica, Calif., a corporation of
California
Filed May 24, 1967, Ser. No. 640,946
12 Claims. (Cl. 340—173)

ABSTRACT OF THE DISCLOSURE

This invention relates to a technique for rapid readout of an electrolytic cell accumulator which has accumulated a large storage charge of plated material at a low average current. The rapid readout is accomplished by using a source of current to produce a flow of current through the electrolytic cell in a direction to discharge the storage charge of plated material and wherein the discharge current has a non-uniform characteristic with a large initial value and a significantly smaller final value. The non-uniform discharge current may also be used to produce a storage of the same information in an auxiliary electrolytic cell and with the actual readout of the information accomplished by the passage of a constant current through the auxiliary electrolytic cell.

---

The present invention relates to the rapid readout of electrolytic cell accumulators. Electrolytic cells may be used to provide a storage of information through the transfer of an active material from a first electrode to a second electrode by the passage of current through the electrolytic cell. The electrolytic cell, for example, may consist of an outer housing which serves as a first electrode and with an inner electrode extending into and insulated from the outer housing. The first electrode may be constructed of, or have at least a layer of, an active material such as silver. The second inner electrode may be constructed of, or at least have a layer of, an inert material such as gold so as to serve as a plating surface for the active material. The interior of the electrolytic cell is filled with an electrolyte such as a liquid or solid electrolyte. A clearer understanding of the electrolytic cell described above may be had with reference to application Ser. No. 519,634, filed Jan. 10, 1966, in the name of Martin Mintz and assigned to the same assignee as the instant application.

The electrolytic cell as described above may be used as a storage element by passing current through the electrolytic cell so as to plate the active material from the first electrode on the second electrode in accordance with the value of the current and in accordance with the time the current flows. The information, which is in the form of a stored charge of plated material, may be read out at a subsequent time by the passage of a current in a direction to deplate the active material from the second electrode back to the first electrode. The readout is usually accomplished by maintaining the readout current at a constant value and with a measurement of the time necessary to deplate all of the stored material. This current time relationship for the readout provides for the measurement of the stored information.

The electrolytic cell exhibits a voltage characteristic which changes in accordance with the stored information so as to provide for an indication when all of the stored material has been deplated. For example, the electrolytic cell has a low resistance when active material is plated on the second electrode. As the active material is deplated, the electrolytic cell exhibits this low resistance until the plated active material is decreased to a small amount. Near the end of the deplating, the resistance of the electrolytic cell starts to increase and this increase in resistance changes at a rapid rate as the electrolytic cell is completely deplated. This change in resistance may be reflected as a change in voltage which, in turn, may be monitored so as to provide for an indication when all of the active material has been deplated from the second electrode.

In the normal operation of the electrolytic cell accumulators, the information is stored and read out at current levels which are not significantly different. Therefore, the information is recorded using a first current level so as to provide for the transfer of the active material and a second constant current level is used for the readout current. The accuracy of the readout of the electrolytic cell is fairly high when the levels of current used for storage and readout are approximately the same.

One problem which has been experienced is in the readout of an electrolytic cell which has accumulated a large quantity of stored material at a very low average current. If the electrolytic cell is then read out using a constant current of a low value, the readout is accomplished with good accuracy. However, it would take much too long to read out the electrolytic cell at such a low constant current, so it is desirable to read out the electrolytic cell rapidly through the use of a much larger readout current. Unfortunately, the use of a relatively high current during the readout causes the electrolytic cell to give a false cutoff indication due to the undercutting of the plated material at particular regions.

In order to provide for a rapid readout using a high current, it is necessary that the information also be recorded at a high current. This is especially true during the last portion of the readout when the high current can cause the undercutting of the plated material so as to give a false cutoff indication.

It is, therefore, desirable to provide for a technique for the rapid readout of an electrolytic cell which has accumulated a large quantity of stored material at a very low average current. The present invention contemplates this rapid readout through the use of a deplating current passing through the electrolytic cell wherein the deplating current has a large initial value which subsequently falls at a rapid rate to a significantly lower value. This allows the electrolytic cell to be deplated with a large current during the initial time interval when the level of the current is not critical and to be deplated with a much lower current at a later time when the level of the current is critical. The electrolytic cell itself may be used in circuit with a constant voltage source so as to provide for the desired change of current due to the normal change in resistance of the electrolytic cell as the cell is deplated.

Unfortunately, it is difficult to calculate the value of the information stored in the electrolytic cell referred to as the primary electrolytic cell using a deplating current which has variable non-uniform characteristics. The present invention, therefore, contemplates the use of an auxiliary electrolytic cell which is maintained in series with the primary electrolytic cell so as to provide for a storage of information in the auxiliary electrolytic cell at the same time the primary electrolytic cell is being deplated.

The storage of information in the auxiliary electrolytic cell is accomplished with the same deplating current so that the information stored in the auxiliary electrolytic cell is substantially identical to the information which was stored in the primary electrolytic cell. However, the information stored in the auxiliary electrolytic cell has its initial plating produced by a large current since the initial deplating current for the primary electrolytic cell is large and with the final storage of information in the auxiliary cell produced by a low current since the final deplating current for the primary electrolytic cell is low. Therefore, the auxiliary cell may be read out at a relatively high constant current so as to determine the information stored in the primary cell.

One embodiment of the invention contemplates the recording and readout of the auxiliary cell by a two-step process, while a second embodiment of the invention contemplates a simultaneous recording and readout of the auxiliary cell so as to provide a determination of the information stored in the primary cell. A clearer understanding of the invention as exemplified by particular embodiments will be had with reference to the following description and drawings wherein.

Figure 1:
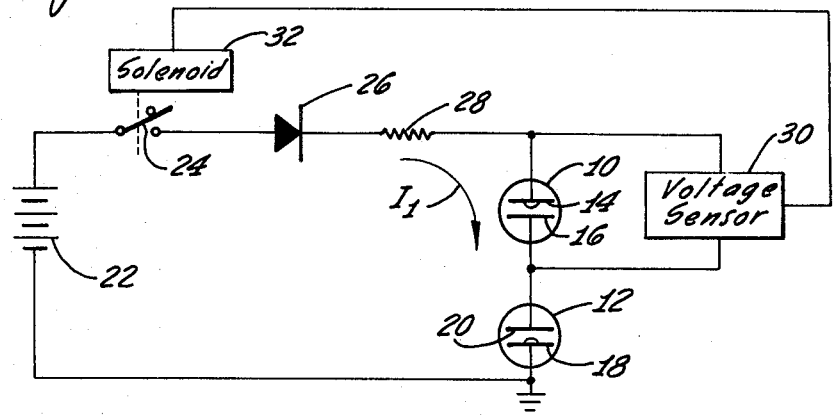
FIGURE 1 is a schematic drawing of a circuit for transferring stored information from a primary to an auxiliary cell.

In FIGURE 1, an electrical schematic is shown for a circuit transferring stored information from a primary electrolytic cell 10 to an auxiliary electrolytic cell 12. The primary electrolytic cell 10 may include a pair of electrodes 14 and 16 and wherein electrode 14 may represent an electrode which includes a stored charge of active material representing information. For example, electrode 14 may be the inner electrode and electrode 16 may be the outer electrode of an electrolytic cell of the type shown in copending application Ser. No. 519,634.

The auxiliary electrolytic cell 12 may include a first electrode 18 and a second electrode 20 and wherein the electrode 18 may be an inner electrode which receives active material. In FIGURE 1, the primary electrolytic cell 10 may have a charge of stored material on the electrode 14 which stored material has been accumulated at a low average current.

As indicated above, it is desirable to recover this stored information at a rapid rate. Unfortunately, the recovery of this information at a rapid rate produces false cutoff indications which result in errors in the readout of the stored material. Specifically, the use of the high current produces undercutting during the last stages of readout which produce the false cutoff indication.

The most critical time for recovery is at the last stages and at that time it is necessary to read out the information at a low current, if the information has been recorded at a low average current. If the information has been recorded at a rapid rate, it may be read out at a rapid rate. The present invention, therefore, contemplates the readout of the information from the primary cell 10 through the use of a current which has a high initial current density which changes rapidly and is to fall to a significantly lower current density. This change in current density provides for a readout from the primary electrolytic cell at a relatively rapid rate without the false cutoff as indicated above. Unfortunately, it is difficult to measure the time-current product when using a non-uniform readout current, so the present invention contemplates a further improvement by the transfer of the information from the primary cell, which has been recorded at a low average current, to an auxiliary cell so that the auxiliary cell is recorded at a relatively high current density at the critical times.

The above transfer may be accomplished by the circuit of FIGURE 1. In FIGURE 1, a source of voltage 22 supplies the current $I_1$ to the primary electrolytic cell 10 and a secondary electrolytic cell 12. A switch 24 controls the flow of current to a diode 26 and a resistor 28. The diode 26 prevents current flowing in the wrong direction, and the value of the resistor 28 is adjusted to provide for the particular desired current value. A voltage sensor 30 senses the change in voltage across the electrolytic cell 10 and the output from the voltage sensor is used to control a solenoid 32. The solenoid 32 in turn controls the switch 24.

Figure 2:
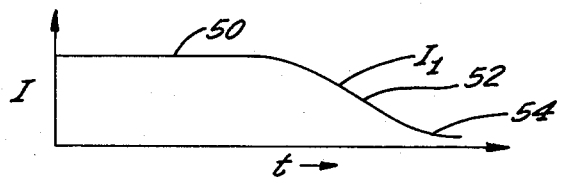
FIGURE 2 is a curve of current versus time for the circuit of FIGURE 1.

The current $I_1$ flowing in the circuit of FIGURE 1 is shown in FIGURE 2. As can be seen in FIGURE 2, the current $I_1$ has a large initial value as shown at position 50 and rapidly decreases as shown at position 52 to a low value 54.

The operation of the circuit of FIGURE 1 is as follows: The switch 24 is closed and the current $I_1$ starts to flow through the circuit consisting of the diode 26, the resistor 28 and the primary and auxiliary electrolytic cells 10 and 12. The resistance of the primary cell 10 is the primary resistance in the circuit to control the value of the current $I_1$. The resistance of the primary cell 10 is initially small so as to allow a large current value 50 to flow. It is to be appreciated that this small value of resistance of the electrolytic cell 10 is still significantly higher than the total of the remaining resistances in the circuit.

As the active material stored on the electrode 14 is deplated by the current $I_1$, active material is being plated in the auxiliary electrolytic cell 12 from the electrode 20 to the electrode 18. This plating in the electrolytic cell 12 is initially at a high current rate, as shown by the value 50 for the current $I_1$. When the stored material on the electrode 14 of the primary electrolytic cell 10 is almost completely deplated, the resistance of the electrolytic cell 10 starts to increase. The change in resistance decreases the current as shown by the value 52 of the current in FIGURE 2. The decrease in current prevents large current densities from producing a false cutoff by undercutting the plated material. The current $I_1$ rapidly decreases to the value 54 so that the remaining portion of the material stored in the auxiliary cell 12 is deplated at a low current density.

When the plated material is completely deplated from the primary electrolytic cell 10, the resistance of the electrolytic cell has increased rapidly so as to increase the voltage across the electrolytic cell 10. This increase in voltage is sensed by the voltage sensor 30 which controls the solenoid 32 so as to open the switch 24. The supply of current is, therefore, stopped when the electrolytic cell 10 has been completely deplated. The electrolytic cell 12 has been plated with the same quantity of stored material as the electrolytic cell 10, but the storage of the plated material in the electrolytic cell 12 during the initial critical time has been produced at a much higher current density so as to allow for a subsequent deplating of the electrolytic cell 12 at a high constant current density.

Figure 3:
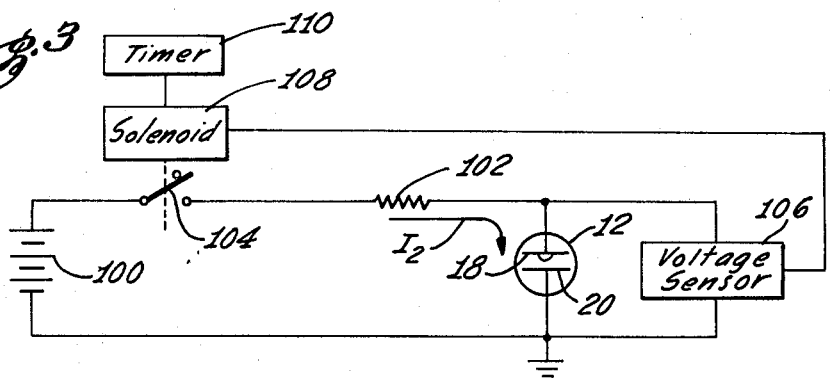
FIGURE 3 is a schematic drawing of a circuit for the readout of the information from the auxiliary cell.
Figure 4:
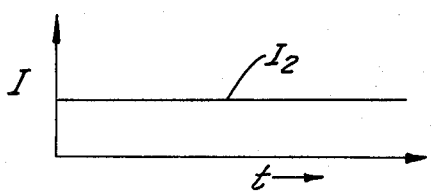
FIGURE 4 is a curve of current versus time for the circuit of FIGURE 3.

FIGURE 3 illustrates a readout circuit for reading out the information stored in the auxiliary cell 12, which information is substantially identical to the information which was stored in the primary cell 10 shown in FIGURE 1. In FIGURE 3, a source of voltage 100 produces a current flow $I_2$ through a resistor 102 and the electrolytic cell 12. The resistor 102 is relatively large compared to any resistance of the electrolytic cell 12 so as to produce a substantially constant current flow through the electrolytic cell 12. A switch 104 controls the passage of current through the resistor 102 and the electrolytic cell 12. The voltage across the electrolytic cell 12 is monitored by a voltage sensor 106 which in turn controls a solenoid 108. The solenoid 108 not only controls the switch 104 but also controls a timer 110. The current $I_2$ is shown in FIGURE 4 and is shown to have a substantially constant value.

In the operation of the circuit of FIGURE 3, the switch 104 is closed and the timer 110 is started. The current $I_2$ flows through the electrolytic cell 12 and deplates the electrolytic cell at a constant rate in accordance with the constant current value of the current $I_2$. When the electrolytic cell 12 has been completely deplated by the transfer of the active material from the electrode 18 to the electrode 20, the electrolytic cell experiences an increase in resistance so as to produce an increase in voltage across the electrolytic cell 12. Voltage sensor 106 senses this increase in voltage and the voltage sensor 106 produces a signal to control the solenoid 108. The solenoid 108 opens the switch 104 and stops the timer 110.

The product of the time recorded by the timer 110 and the current $I_2$ determines the quantity of stored material in the electrolytic cell 12. The storage of the information in the electrolytic cell 12 is subsantially identical to the information stored by the electrolytic cell 10 as indicated above, so that the readout of the electrolytic cell 12 provides for a measurement of the information stored by the cell 10. The technique described by the circuits of FIGURES 1, 2, 3 and 4, therefore, allows for a rapid readout of the information from an electrolytic cell such as the cell 10 which has been recorded with information at a very low average current.

Figure 5:
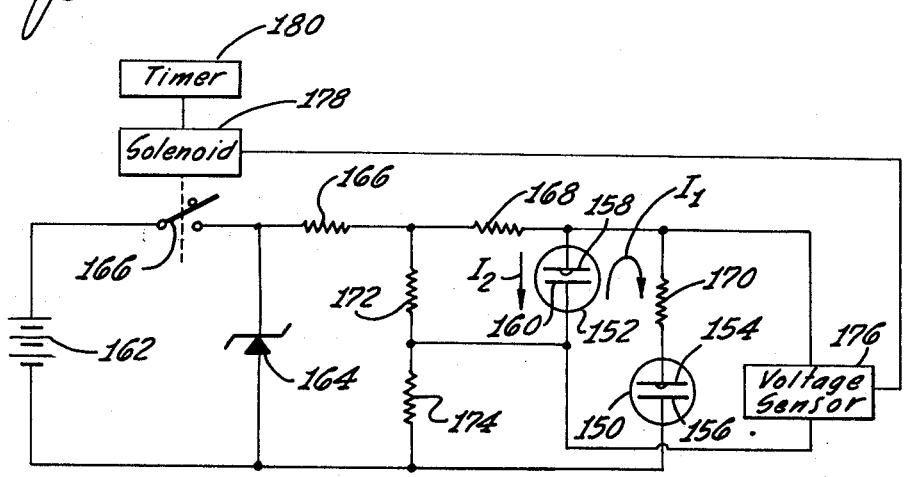
FIGURE 5 is a schematic drawing of a circuit for providing a simultaneous recording and readout of information transferred from a primary to an auxiliary electrolytic cell.

FIGURE 5 illustrates an electrical circuit for transferring the information stored on a primary cell 150 to an auxiliary cell 152 and with a readout of the information from the auxiliary cell and wherein the transfer of information and the readout of the information from the auxiliary cell 152 is accomplished at the same time. In FIGURE 5, the primary electrolytic cell 150 includes a first electrode 154 and a second electrode 156. The first electrode 154 may be an inner electrode of the type shown in copending application Ser. No. 519,634 and the electrode 156 may be an outer electrode of the type shown in the copending application. The information has been stored by the plating of the active material from the electrode 156 to the electrode 154. The auxiliary electrolytic cell 152 may also be of the type shown in the copending application and includes a first electrode 158 which may be an inner electrode which receives the active material and a second outer electrode 160.

The circuit of FIGURE 5 includes a source of voltage 162. The source of voltage 162 is connected across a diode 164 such as a Zener diode which acts as a voltage regulator. A switch 166 is coupled in series with the source of voltage 162 so as to connect or disconnect the voltage from the remaining portion of the circuit. A plurality of resistors 166, 168, 170, 172 and 174 are used to divide the voltage and to produce a substantially constant voltage at the junction between the resistors 172 and 174 and to produce a substantially constant current through the auxiliary electrolytic cell 152.

A voltage sensor 176 is connected across the auxiliary electrolytic cell 152 to detect a change in voltage across the auxiliary cell when the auxiliary cell 152 is deplated. The voltage sensor 176 produces an output signal to control a solenoid 178. The solenoid in turn controls the switch 166 and a timer 180.

Figure 6:
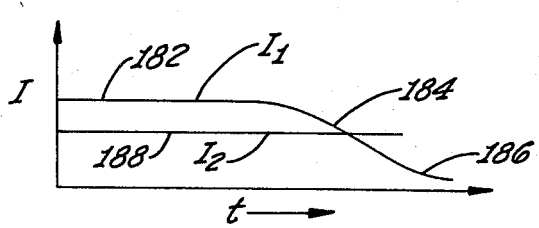
FIGURE 6 is a curve illustrating the current versus time for the circuit of FIGURE 5.

The currents flowing through the electrolytic cells 150 and 152 are shown in FIGURE 6. Current $I_1$ has a high initial value as shown at position 182 which decreases rapidly as shown at position 184 and reaches a low value as shown at position 186. The current $I_2$ is essentially a constant current as shown by the line 188.

The operation of the circuit of FIGURE 5 is essentially as follows: The switch 166 is closed and the timer 180 is started. The voltage source 162 produces a flow of current through the resistor 166. In addition, the combination of the resistors 172 and 174 act as a voltage divider so as to produce a substantially constant voltage at the junction between the two resistors 172 and 174. The constant voltage produces a flow of current $I_1$ through the electrolytic cells 152 and 150.

The current $I_1$ is in a direction to deplate the electrolytic cell 150 and plate the electrolytic cell 152. The resistance of the electrolytic cell 150 is large compared to the other resistances in this current path, so that the resistance of the electrolytic cell 150 essentially controls the current $I_1$. The resistance of the electrolytic cell 150 is initially low so that a relatively high value of current flows, as shown at position 182 in FIGURE 6. This large current is used to rapidly deplate the stored material in the electrolytic cell 150. At the same time the electrolytic cell 150 is being deplated, the electrolytic cell 152 is being plated by the same current $I_1$. Therefore, the electrolytic cell 152 is plated with the same quantity of stored material as the electrolytic cell 150.

As the stored material decreases within the electrolytic cell 150, the resistance of the cell 150 increases to reduce the current as shown in positon 184. This change in resistance is fairly rapid and the total amount of stored material which is deplated during this period of rapid change is usually less than 20% of the total amount of stored material. The resistance continues to fall off rapidly so that the current decreases to the low value shown by position 186.

At the same time the electrolytic cell 152 is being plated by the current $I_1$, a second constant current $I_2$ is passing through the electrolytic cell 152 in the opposite direction to the current $I_1$. The resistor 168 essentially makes a constant current source of the voltage 162 so that the current $I_2$ has a level as shown by the level 188 in FIGURE 6. The current $I_2$ flowing through the electrolytic cell 152 deplates the stored material which is being plated by the current $I_1$. Initially, the current $I_1$ is greater than the current $I_2$ so that the plating occurs at a more rapid rate than the deplating. However, at some crossover point the current $I_2$ is larger than the decreasing value of the current $I_1$ so that eventually the current $I_2$ deplates all of the stored materials. Although a very low value of the current $I_1$ continues to flow after the cell 150 is deplated, the current $I_2$ is much larger at this time so that the cell 152 is rapidly deplated before any substantial error can occur.

When the electrolytic cell 152 is completely deplated, the voltage sensor 176 detects the changes in voltage produced by the change in resistance of the electrolytic cell 152 and the voltage sensor 176 produces an output signal to control the solenoid 178 to open the switch 166. Also, the timer 180 is stopped so as to give an indication of the time necessary to deplate the electrolytic cell 152.

As indicated above, the combination of the current value for the current $I_2$ and the time for deplating represents the information stored in the electrolytic cell 152 which in turn represents the information stored in the electrolytic cell 150.

It is to be appreacited that although the invention has been shown with reference to particular examples, other adaptations and modifications may be made so that the invention is only to be limited by the appended claims.

What is claimed is:

1. A method of rapid readout of an electrolytic cell accumulator which has accumulated a large storage charge at a low average current, including the steps of
   connecting the electrolytic cell to a source of current to produce a flow of current through the electrolytic cell in a direction to discharge the stored charge, and
   controlling the flow of current to produce a non-uniform current flow through the electrolytic cell and with the non-uniform current flow having a large initial value and a significantly smaller final value.

2. The method of claim 1 wherein the change in current flow between the large initial value and the significantly smaller final value occurs at a continuously rapidly decreasing rate.

3. The method of claim 1 wherein the discharge of the electrolytic cell after the large initial value of current flow is less than 20% of the total discharge.

4. A method of rapid readout of a primary electrolytic cell accumulator which has accumulated a large quantity of plated material by the flow of current at a low average value, including the steps of connecting an auxiliary electrolytic cell accumulator in circuit with the primary electrolytic cell accumulator, connecting the circuit including the primary and auxiliary electrolytic cell accumulators to a source of current to produce a flow of current through the primary and auxiliary electrolytic cell accumulators in a direction to deplate the plated material in the primary electrolytic cell accumulator and to plate material in the auxiliary electrolytic cell accumulator and with the deplating and plating occurring at substantially the same rate, and controlling the flow of current through the primary and auxiliary electrolytic cell accumulators to produce a non-uniform flow of current having a high initial value and a significantly lower final value.

5. The method of claim 4 wherein the change in current flow between the large initial value and the significantly smaller final value occurs at a continuously rapidly decreasing rate.

6. The method of claim 4 wherein the deplating of the primary electrolytic cell accumulator after the large initial value of current flow is less than 20% of the total accumulated plated material.

7. A method of rapid readout of a primary electrolytic cell which is storing a large quantity of plated material by the flow of current at a low average value including the steps of connecting an auxiliary electrolytic cell in circuit with the primary electrolytic cell, connecting the circuit including the primary and auxiliary electrolytic cells to a first source of current to produce a flow of first current through the primary and auxiliary electrolytic cells in a direction to deplate the stored plated material in the primary electrolytic cell and to store material by plating in the auxiliary electrolytic cell and with the deplating and plating occurring at substantially the same rate, controlling the flow of first current through the primary and auxiliary electrolytic cells to produce a non-uniform flow of current having a high initial value and a significantly lower final value, and reading out the auxiliary electrolytic cell by passing a second constant current through the auxiliary electrolytic cell in a direction to deplate the stored plated material.

8. The method of claim 7 wherein the high initial value of the first current is significantly higher in value than the second constant current and the constant current is significantly higher in value than the low average value of current.

9. The method of claim 7 wherein the non-uniform flow of first current and the second constant current both flow through the auxiliary cell at the same time.

10. A method of rapid readout of a primary electrolytic cell which is storing a large quantity of plated material by the flow of current at a low average value including the steps of:

connecting the circuit including the primary and auxilthe primary electrolytic cell, connecting the circuit including the primary and auxiliary electrolytic cells to a first source of current to produce a flow of first current through the primary and auxiliary electrolytic cells in a direction to deplate the stored plated material in the primary electrolytic cell while at the same time storing material by plating in the auxiliary electrolytic cell and with the deplating and plating occurring at substantially the same rate, controlling the flow of first current through the primary and auxiliary electrolytic cells to produce a nonuniform flow of current having a high initial value followed by continuously rapidly decreasing value to a significantly lower final value, and reading out the auxiliary electrolytic cell by passing a second constant current through thte auxiliary electrolytic cell in a direction to deplate the stored plated material.

11. The method of claim 10 wherein the high initial value of the first current is significantly higher in value than the second constant current.

12. The method of claim 10 wherein the non-uniform flow of the first current and the second constant current both flow through the auxiliary cell at the same time in opposite directions.

References Cited

UNITED STATES PATENTS

| | | | |
|---|---|---|---|
| 3,331,054 | 7/1967 | Trehub | 340—172.5 |
| 3,290,673 | 12/1966 | Bullock | 340—347 |
| 3,017,612 | 1/1962 | Singer | 340—173 |

TERRELL W. FEARS, *Primary Examiner.*